US011288216B1

(12) United States Patent
Thiruchengode Vajravel et al.

(10) Patent No.: US 11,288,216 B1
(45) Date of Patent: Mar. 29, 2022

(54) PRIORITY REVERSING DATA TRAFFIC FOR LATENCY SENSITIVE PERIPHERALS

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/039,370

(22) Filed: Sep. 30, 2020

(51) Int. Cl.
*G06F 13/18* (2006.01)
*G06F 13/16* (2006.01)
*G06F 9/48* (2006.01)
*G06F 13/40* (2006.01)
*G06F 13/38* (2006.01)

(52) U.S. Cl.
CPC ............ *G06F 13/18* (2013.01); *G06F 9/4881* (2013.01); *G06F 13/1642* (2013.01); *G06F 13/385* (2013.01); *G06F 13/409* (2013.01); *G06F 13/4068* (2013.01)

(58) Field of Classification Search
CPC ..................................................... G06F 9/4881
See application file for complete search history.

(56) References Cited

U.S. PATENT DOCUMENTS

| | | | | |
|---|---|---|---|---|
| 6,170,020 B1 * | 1/2001 | Blakeney | .............. | G06F 1/1632 710/10 |
| 6,665,765 B1 * | 12/2003 | Tang | .................. | G06F 13/4081 710/10 |
| 10,063,751 B2 * | 8/2018 | Hamsici | .................. | G06F 16/50 |
| 10,402,364 B1 * | 9/2019 | Vajravel | ................ | H04L 67/141 |
| 2002/0069310 A1 * | 6/2002 | Scandurra | ............. | G06F 13/362 710/240 |
| 2005/0114569 A1 * | 5/2005 | Bogin | ..................... | G06F 13/28 710/52 |

(Continued)

OTHER PUBLICATIONS

Logitech C390e Business Webcam, retrieved from url: http://logitech.com/en-in/products/webcams/c930c-bussiness-webcam.960-000976.html, retrieved on Mar. 12, 2021.

(Continued)

*Primary Examiner* — Henry Tsai
*Assistant Examiner* — Aurangzeb Hassan
(74) *Attorney, Agent, or Firm* — Baker Botts L.L.P.

(57) ABSTRACT

Priority reversing data traffic for latency sensitive peripherals, including receiving a connection notification and parameters of a peripheral; identifying, from the parameters, that an interface type associated with the peripheral is a bulk interface, the bulk interface associated with a first communication channel between the IHS and the peripheral and having a first latency; determining, based on the bulk interface type and a data traffic priority associated with the peripheral, that the data traffic associated with the peripheral is priority-inversed; in response to a communication request by an application executing on the IHS for communication with the peripheral, determining that the data traffic associated with the peripheral is priority-inversed, and in response, placing the data traffic in a queue associated with a second communication channel defined between the IHS and the peripheral, the second communication channel having a second latency, wherein the first latency is greater than the second latency.

17 Claims, 3 Drawing Sheets

(56) References Cited

U.S. PATENT DOCUMENTS

| | | | | |
|---|---|---|---|---|
| 2005/0138229 | A1* | 6/2005 | Sartore | G06F 13/385 710/15 |
| 2006/0075286 | A1* | 4/2006 | Hodge | G06F 11/2268 714/5.11 |
| 2008/0188125 | A1* | 8/2008 | Horiuchi | H01R 13/6485 439/607.01 |
| 2013/0322462 | A1* | 12/2013 | Poulsen | H04J 3/06 370/458 |
| 2016/0124772 | A1* | 5/2016 | Mirza | G06F 12/023 718/104 |
| 2017/0109299 | A1* | 4/2017 | Belair | G06F 13/4068 |
| 2019/0295496 | A1* | 9/2019 | Wagner | G09G 5/006 |

OTHER PUBLICATIONS

Yoga X380—external webcam not working correctly when plugged into USB-C dock, retrieved from url: https://forums.lenovo.com/t5/ThinkPad-X-Series-Laptops/Yoga-X380-external-webcam-not-working-correctly-when-plugged/td-p/4259270, retrieved on Mar. 12, 2021.

USB cam flickering—HP thunderbolt dock 2., retrieved from url: https://h30434.www3.hp.com/t5/Business-Notebooks/USB-cam-flickering-HP-thunderbolt-dock-2/td-p/7108142, retrieved on Mar. 12, 2021.

Stuttering sound from external speakers, retrieved from url: https://answers.microsoft.com/en-us/windows/forum/all/stuttering-sound-from-external-speakers/3b0e617a-c91c-4389-8b7d-b178192a1cab, retrieved on Mar. 12, 2021.

Wacom 16 pro and dell G5 5587, retrieved from url: http://forum.wacom.eu/viewtopic.php?t=2015#p6556, retrieved on Mar. 12, 2021.

USB client frivers for Media-Agnostic (MA-USB), retrieved from url: https://docs.microsoft.com/en-us/windows-hardware/drivers/usbcon/usb-client-drivers-for-ma-usb#setting-priority-for-a-bulk-endpoint, retrieved on Mar. 12, 2021.

* cited by examiner

PRIORITY REVERSING DATA TRAFFIC FOR LATENCY SENSITIVE PERIPHERALS

BACKGROUND

Field of the Disclosure

The disclosure relates generally to an information handling system, and in particular, priority reversing data traffic for latency sensitive peripherals.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The information handling system can be connected to a peripheral (or peripherals) through a docking station (or dock). Communication between the information handling system and the peripheral can occur through isochronous and/or non-isochronous channels. A requirement of the isochronous channel is that the traffic data transmitted along the isochronous channel is to have a continuous (frame-rate) and same packet size (frame-size). As a result of the requirement, many peripherals (devices) use non-isochronous (bulk) channels to transport data traffic, including latency sensitive data traffic.

For example, a monitor (FHD/QHD/UHD) with an integrated webcam can be connected to the information handling system via the dock. The resolution of the webcam can match the resolution of the monitor—e.g., 1080p and 2K 20/60 fps webcams are common. Such high-resolution webcams, rather than utilizing raw frames, utilize H264/YUV2/MPEJ encoded frames. However, if these encoded frames are not regular in size or rate, the non-isochronous (bulk) channel will be used to transmit such as opposed to the isochronous channel. This latency sensitive data traffic may be not be delivered on-time as the non-isochronous (bulk) channel may be de-prioritized (as compared to the isochronous channel), resulting in lag and poor user experience.

SUMMARY

Innovative aspects of the subject matter described in this specification may be embodied in method for priority reversing data traffic for latency sensitive peripherals, comprising: receiving i) a device arrival notification of a connection of a peripheral to a computing dock, and ii) parameters of the peripheral, wherein an information handling system is connected to the computing dock for access to the peripheral; identifying, from the parameters of the peripheral, that an interface type associated with the peripheral is a bulk interface, the bulk interface associated with a first communication channel between the information handling system and the peripheral, the first communication channel associated with a first latency; determining, from the parameters of the peripheral, a data traffic priority associated with the peripheral; determining, based on the bulk interface type and the data traffic priority, that the data traffic associated with the peripheral is priority-inversed; updating an index stored in a cache to indicate that the data traffic associated with the peripheral is priority-inversed; identifying a communication request by an application executing on the information handling system for communication with the peripheral; in response to the communication request: accessing the index; determining, based on the index, that the data traffic associated with the peripheral is priority-inversed; and in response to determining that the data traffic associated with the peripheral is priority-inversed, placing the data traffic in a queue associated with a second communication channel defined between the information handling system and the peripheral, the second communication channel having a second latency, wherein the first latency is greater than the second latency.

Other embodiments of these aspects include corresponding systems, apparatus, and computer programs, configured to perform the actions of the methods, encoded on computer storage devices.

These and other embodiments may each optionally include one or more of the following features. For instance, the first communication channel is further defined to include the computing dock, and wherein the second communication channel is further defined to include the computing dock. Receiving a particular identifier associated with the peripheral; comparing the particular identifier with a listing of identifiers stored by the index; determining, based on the comparing, that the listing is absent the particular identifier; and in response to the listing being absent the particular identifier, identifying the interface type associated with the peripheral and determining the data traffic priority associated with the peripheral. The parameters include a device class of the peripheral. The peripheral is a network-enabled video camera. The peripheral is an universal serial bus (USB) device. The computing dock is a wireless computing dock. The first communication channel is non-isochronous communication channel. The second communication channel is an isochronous communication channel.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for priority reversing data traffic for latency sensitive peripherals. In short, a priority of latency-sensitive traffic data between an information handling system and a computing peripheral can be identified and re-classified. For example, latency-sensitive traffic data that is marked for a non-isochronous/bulk communication channel between the information handling system and the computing peripheral can be re-classified for an isochronous communication channel. That is, the priority of the latency-sensitive traffic data can be adjusted (increased) such that the latency-sensitive traffic data is transmitted along the isochronous communication channel that is originally marked for communication along the non-isochronous/bulk communication channel.

Specifically, this disclosure discusses a system and a method of priority reversing data traffic for latency sensitive peripherals, including receiving i) a device arrival notification of a connection of a peripheral to a computing dock, and ii) parameters of the peripheral, wherein an information handling system is connected to the computing dock for access to the peripheral; identifying, from the parameters of the peripheral, that an interface type associated with the peripheral is a bulk interface, the bulk interface associated with a first communication channel between the information handling system and the peripheral, the first communication channel associated with a first latency; determining, from the parameters of the peripheral, a data traffic priority associated with the peripheral; determining, based on the bulk interface type and the data traffic priority, that the data traffic associated with the peripheral is priority-inversed; updating an index stored in a cache to indicate that the data traffic associated with the peripheral is priority-inversed; identifying a communication request by an application executing on the information handling system for communication with the peripheral; in response to the communication request: accessing the index; determining, based on the index, that the data traffic associated with the peripheral is priority-inversed; and in response to determining that the data traffic associated with the peripheral is priority-inversed, placing the data traffic in a queue associated with a second communication channel defined between the information handling system and the peripheral, the second communication channel having a second latency, wherein the first latency is greater than the second latency.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
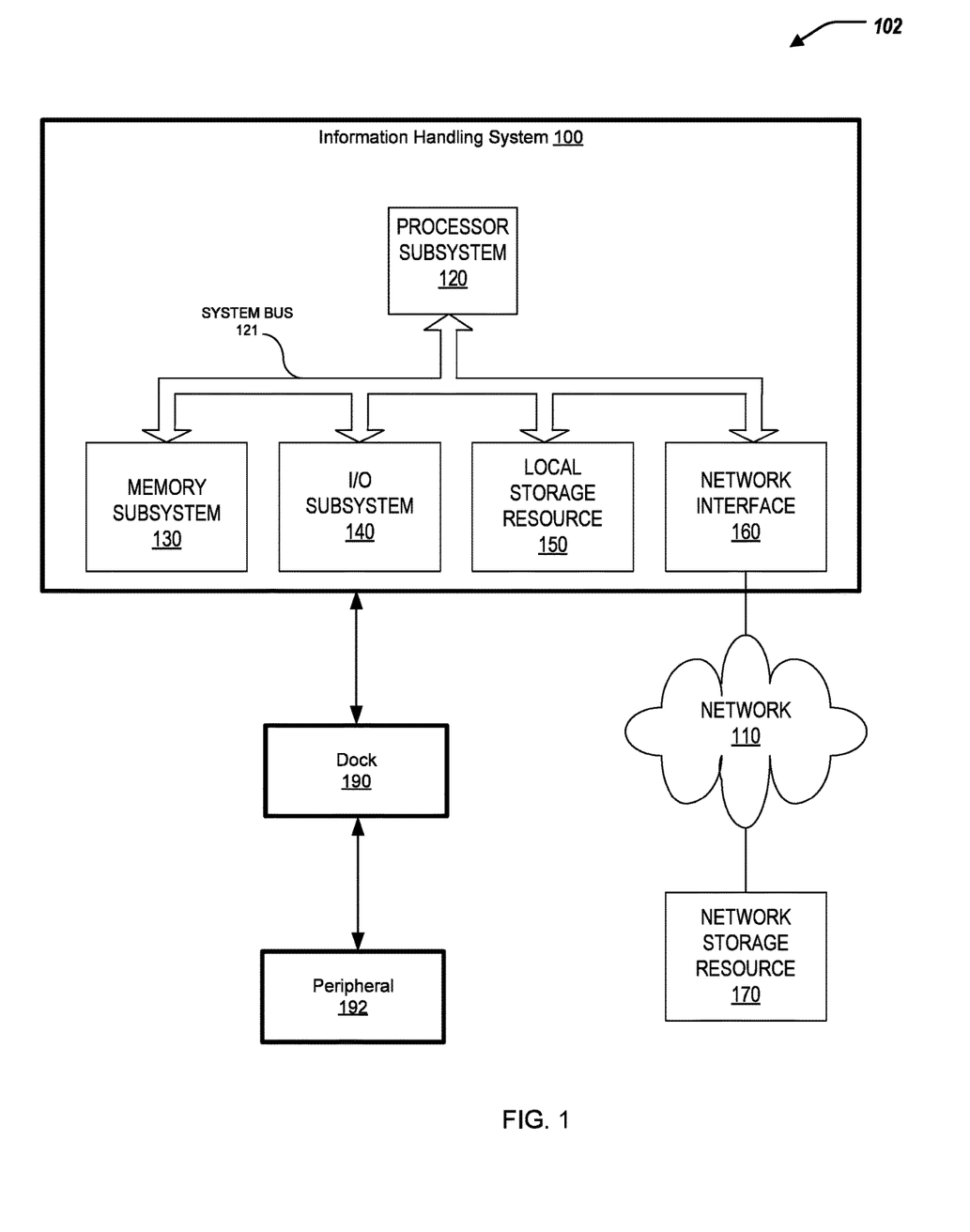
FIG. 1 is a block diagram of selected elements of an embodiment of an information handling system.
Figure 2:
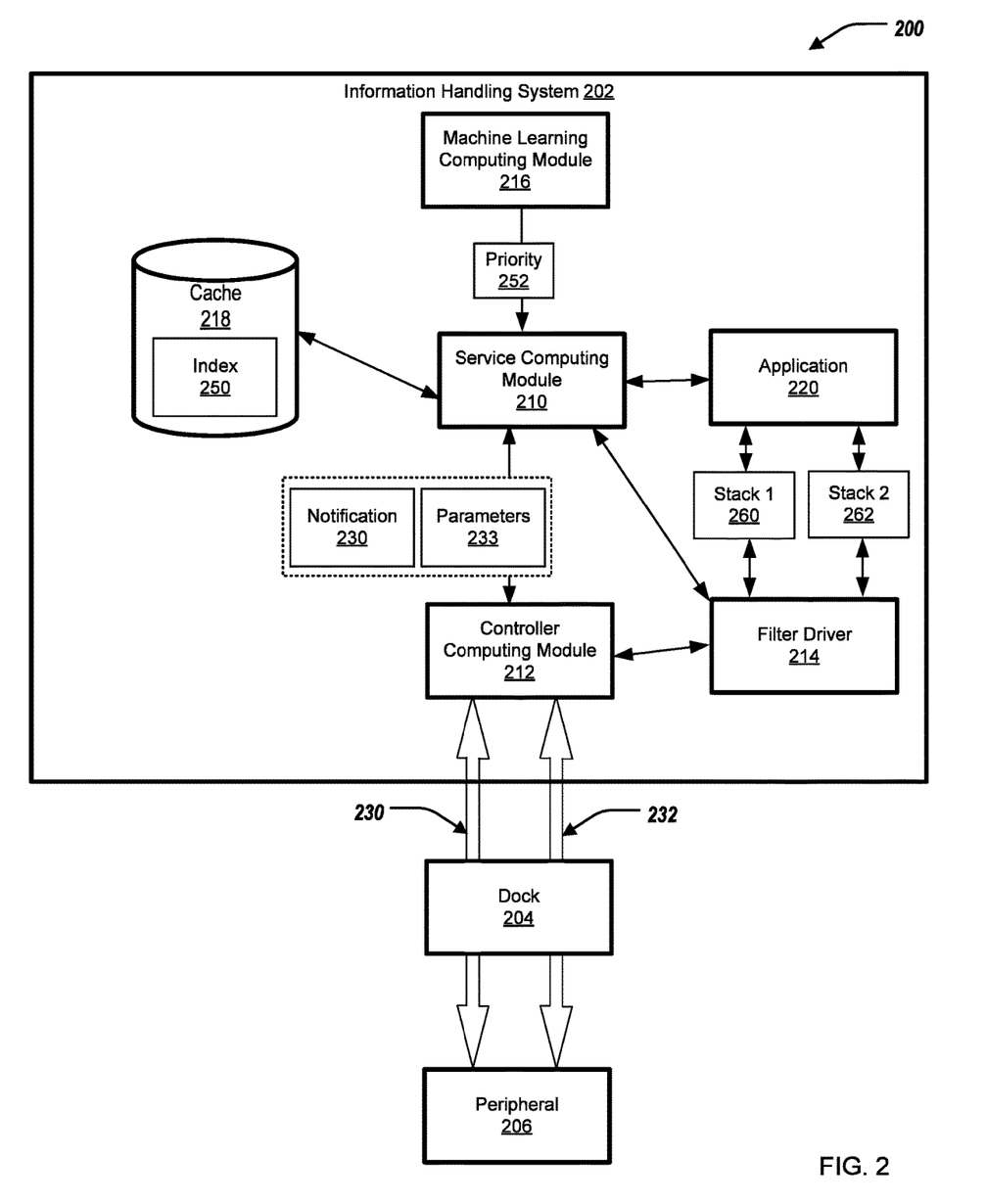
FIG. 2 illustrates a block diagram of an information handling system for priority reversing data traffic for latency sensitive peripherals.
Figure 3:
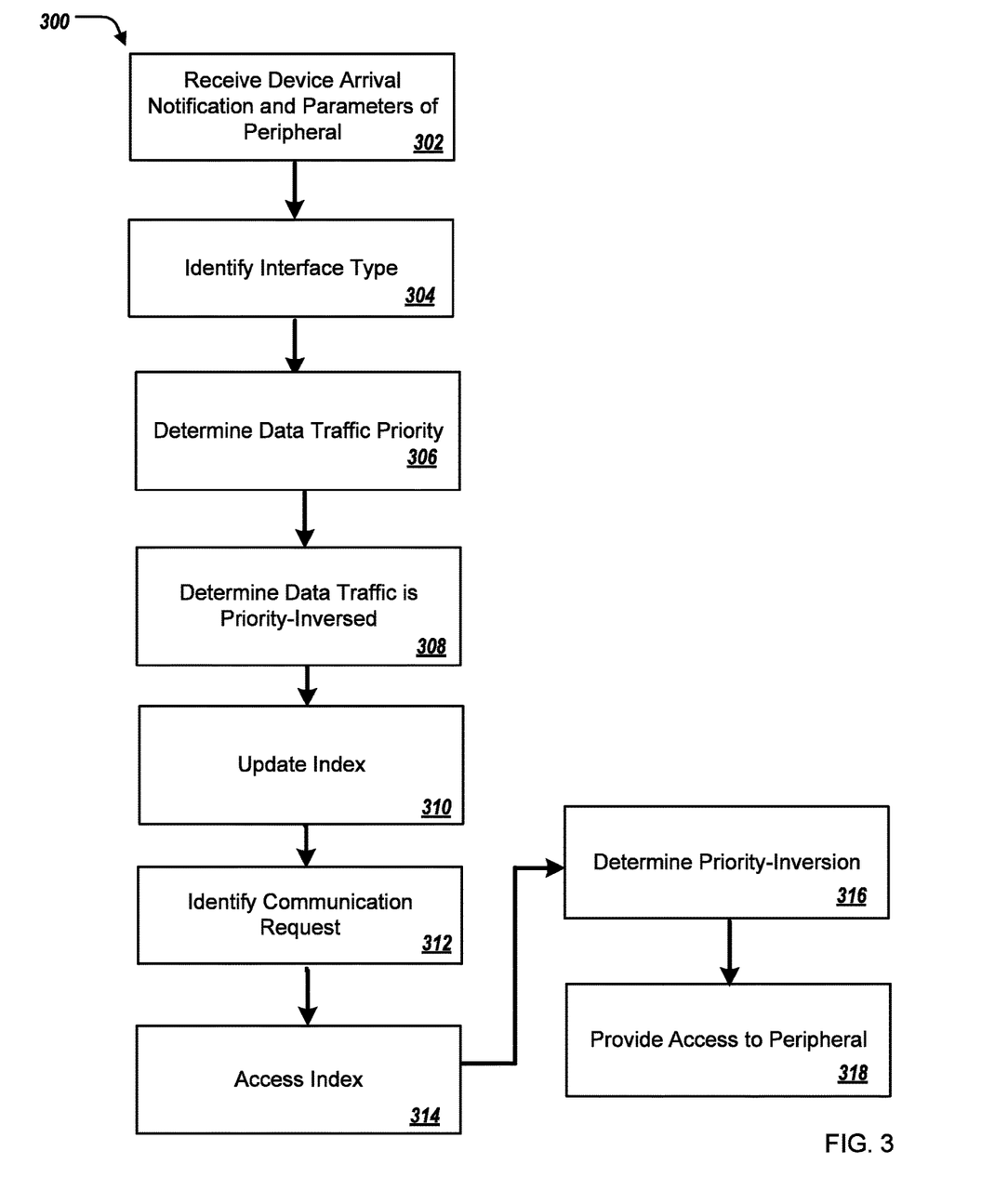
FIG. 3 illustrates a method for priority reversing data traffic for latency sensitive peripherals.

Particular embodiments are best understood by reference to FIGS. 1-3 wherein like numbers are used to indicate like and corresponding parts.

Turning now to the drawings, FIG. 1 illustrates a block diagram depicting selected elements of a computing environment 102 including an information handling system 100, a computing dock 190, and a peripheral 192 in accordance with some embodiments of the present disclosure. The information handling system 100 can be in communication with the peripheral 192 through the computing dock 190. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination 0 thereof.

Turning to FIG. 2, FIG. 2 illustrates an environment 200 including an information handling system 202, a computing dock 204, and a peripheral 206 (or peripherals 206). The information handling system 202 can include a service computing module 210, a controller computing module 212, a filter driver computing module 214, a machine learning (ML) computing module 216, and a cache 218. The information handling system 202 can further include an application 220 that is executable by the information handling system 202 (e.g. executable by the processor subsystem 120 of FIG. 1).

The computing dock 204 can be similar, or the same, as the dock 190 of FIG. 1. The peripheral 206 can be similar, or the same, as the peripheral 192 of FIG. 1. The information handling system 202 can be similar, or the same, as the information handling system 100 of FIG. 1.

The service computing module 210 can be in communication with the controller computing module 212, the filter driver computing module 214, the ML computing module 216, the cache 218, and the application 220. The controller computing module 212 can be in communication with the dock 204, the service computing module 210, and the filter driver computing module 214. The dock 204 can be in communication with the peripheral 206 and the controller computing module 212. The dock 204 can include a wireless or a wired dock. The dock 204 can include a USB dock or a USB-C dock.

The information handling system 202 is connected to the dock 204 for access to the peripheral 206.

Furthermore, a first communication channel 230 and a second communication channel 232 can defined between the information handling system 202 and the peripheral 206. Specifically, the first communication channel 230 can be defined between the controller computing module 212 and the peripheral 206, and can include the dock 204; and the second communication channel 232 can be defined between the controller computing module 212 and the peripheral 206, and can include the dock 204. The first communication channel 230 and the second communication channel 232 are specific for the peripheral 206—that is each peripheral 206 can be associated with their own set of channels.

In some examples, the first communication channel 230 is a non-isochronous communication channel. In some examples, the second communication channel 232 is an isochronous communication channel. In some examples, the latency of traffic data of the first communication channel 230 is greater than the latency of traffic data of the second communication channel 232.

In short, the information handling system 202 can identify and re-classify a priority of latency-sensitive traffic data between the information handling system 202 and the peripheral 206. For example, the information handling system 202 can identify latency-sensitive traffic data that is marked for the first communication channel 230 and re-classify the latency-sensitive traffic data for placing in a queue associated with the second communication channel 232 (e.g., moving the latency-sensitive traffic data to a higher-priority queue). That is, the information handling system 202 can adjust (increase) the priority of the latency-sensitive traffic data such that the latency-sensitive traffic data is placed in a higher-priority queue that is associated with the second communication channel 232 that is an isochronous communication channel (as compared to a lower-priority queue that is associated with the first communication channel 230 that is a non-isochronous communication channel).

In some implementations, the service computing module 210 can receive a notification 231 of a connection of the peripheral 206 to the dock 204. For example, the dock 204 can, upon connection (physical and/or communication) with the peripheral 206, can transmit the notification 231 to the information handling system 202, and specifically to the service computing module 210 through the controller computing module 212. The service computing module 210 can also receive parameters 233 of the peripheral 206. For example, the dock 204 can, upon connection (physical and/or communication) with the peripheral 206, can transmit the parameters 233 to the information handling system 202, and specifically to the service computing module 210 through the controller computing module 212. In some examples, the parameters 233 are obtained from a data store associated with the information handling system 202.

In some examples, the peripheral 206 can include a network-enabled video camera (webcam), such as a hardware code enabled (e.g., H264) webcam. For example, the peripheral 206 can include a webcam with a resolution of 1080p, or 2K with 30/60 fps. In some examples, the peripheral 206 can include a universal serial bus (USB) device. For example, the peripheral 206 can include a USB display adapter, USB multi-channel speakers, and HID devices such as USB digitizer/signature pads.

In some examples, the parameters 233 can include a device class of the peripheral 206. The device class can be defined by the operations system (OS) of the information handling system 202, and can include high-level information of the functionality of the peripheral 206. For example, the device class can include camera, audio, signature pads, imaging, etc. In some examples, the parameters 233 can include applications (e.g., application 220) that are associated with the peripheral 206—e.g., the type of application 220 that interacts/utilizes the peripheral 206. For example, the application 220 can include a video conferencing application, or a webcam firmware upgrade application. In some examples, the parameters 233 can include USB device information of the peripheral 206. For example, the USB device information can include USB-interface details, and USB interface type (e.g., isochronous or non-isochronous).

In some examples, the notification 231 can include a particular identifier (ID) associated with the peripheral 206. The service computing module 210 can compare the identifier of the peripheral 206 with a listing of identifiers stored by an index 250 of the cache 218. Specifically, the index 250 can indicate associations between peripheral identifiers and at least i) an interface type of the corresponding peripheral and ii) data traffic priority associated with the corresponding peripheral. The service computing module 210 can determine, based on the comparing, that the listing of identifiers stored by the index 250 is absent the particular identifier associated with the peripheral 206. The service computing module 210, in response to the listing of identifiers stored by the index 250 being absent the particular identifier associated with the peripheral 206, identifies an interface type associated with the peripheral 206 based on the parameters 233, and a data traffic priority associated with the peripheral 206 based on the parameters 233.

In some examples, the service computing module 210 can determine, based on the comparing, that the listing of identifiers stored by the index 250 includes the particular identifier associated with the peripheral 206. The service computing module 210, in response to the listing of identifiers stored by the index 250 being absent the particular identifier associated with the peripheral 206, identifies an interface type associated with the peripheral 206 from the index 250, and a data traffic priority associated with the peripheral 206 from the index 250.

In some implementations, the service computing module 210, based on the parameters 233 associated with the peripheral 206, identifies that the interface type associated with the peripheral 206 is a bulk interface. That is, the service computing module 210 determines that the first communication channel 230—a bulk/non-isochronous channel—is associated with the peripheral 206 (based on the parameters 233). The service computing module 210, based on the parameters associated with the peripheral 206, determines a data traffic priority associated with the peripheral 206. The service computing module 210, based on the bulk interface type associated with the peripheral 206 and the data traffic priority associated with the peripheral 206, determines that the data traffic associated with the peripheral is priority-inversed.

Specifically, the service computing module 210 can communicate the parameters 233 to the ML computing module 216. The ML computing module 216 can determine whether the data traffic associated with the peripheral 206 is priority revised, e.g., based on the device class of the peripheral 206, the application 220 type, and the USB device information of the peripheral 206. For example, the ML computing module 216 can determines that the traffic priority of the peripheral 206 indicates that the data traffic associated with the peripheral 206 is to be transmitted using the second communication channel 232 (isochronous channel), but the interface type (USB interface type) associated with the peripheral indicates the first communication channel 230 (non-isochronous/bulk channel). When the ML computing module 216 determines such, the ML computing module 216 can mark the peripheral 206 as priority-inversed, and provide a priority inversion indicator 252 to the service computing module 210 indicating such. In some examples, the ML computing module 216 can utilize a machine-learning algorithm, or a neural network (e.g., a convolution neural network) to determine whether the data traffic associated with the peripheral 206 is priority-revised.

For example, the parameters 233 can indicate that the interface type associated with the peripheral 206 is a bulk interface. The parameters 233 can further include that the device class of the peripheral 206 is audio, and the application 220 utilizing the peripheral 206 is a video conferencing application. The ML computing module 216 can determine based on i) the bulk interface type, ii) the audio device class, and iii) the video conferencing application, that the priority is inversed for the data traffic associated with the peripheral 206. That is, the device class (audio) and the application (video conferencing application) associated with the peripheral 206 can indicate that the data traffic associated with the peripheral 206 is to be transmitted along the second communication channel 232 (isochronous). However, the interface type as indicated by the parameters 233 can indicate that the data traffic associated with the peripheral 206 is to be transmitted along the first communication channel 230 (non-isochronous/bulk channel). To that end, the ML computing module 216 can determine, based on such, that the priority is inversed (priority-inversed) for the data traffic associated with the peripheral 206.

For example, the parameters 233 can indicate that the interface type associated with the peripheral 206 is a bulk interface. The parameters 233 can further include that the device class of the peripheral 206 is camera, and the application 220 utilizing the peripheral 206 is a video conferencing application. The ML computing module 216 can determine based on i) the bulk interface type, ii) the camera device class, and iii) the video conferencing application, that the priority is inversed for the data traffic associated with the peripheral 206. That is, the device class (camera) and the application (video conferencing application) associated with the peripheral 206 can indicate that the data traffic associated with the peripheral 206 is to be transmitted along the second communication channel 232 (isochronous). However, the interface type as indicated by the parameters 233 can indicate that the data traffic associated with the peripheral 206 is to be transmitted along the first communication channel 230 (non-isochronous/bulk channel). To that end, the ML computing module 216 can determine, based on such, that the priority is inversed (priority-inversed) for the data traffic associated with the peripheral 206.

For example, the parameters 233 can indicate that the interface type associated with the peripheral 206 is a bulk interface. The parameters 233 can further include that the device class of the peripheral 206 is disk drive, and the application 220 utilizing the peripheral 206 is a data transfer application. The ML computing module 216 can determine based on i) the bulk interface type, ii) the disk drive device class, and iii) the data transfer application, that the priority for the data traffic associated with the peripheral 206 is correct. That is, the device class (disk drive) and the application (data transfer application) associated with the peripheral 206 can indicate that the data traffic associated with the peripheral 206 is to be transmitted along the first communication channel 230 (non-isochronous/bulk channel). The interface type as indicated by the parameters 233 can indicate that the data traffic associated with the peripheral 206 is to be transmitted along the first communication channel 230 (non-isochronous/bulk channel). To that end, the ML computing module 216 can determine, based on such, that the priority is correct for the data traffic associated with the peripheral 206.

For example, the parameters 233 can indicate that the interface type associated with the peripheral 206 is an isochronous interface. The parameters 233 can further include that the device class of the peripheral 206 is camera, and the application 220 utilizing the peripheral 206 is a video conferencing application. The ML computing module 216 can determine based on i) the isochronous interface type, ii) the camera device class, and iii) the video conferencing application, that the priority is for the data traffic associated with the peripheral 206 is correct. That is, the device class (camera) and the application (video conferencing application) associated with the peripheral 206 can indicate that the data traffic associated with the peripheral 206 is to be transmitted along the second communication channel 232 (isochronous). The interface type as indicated by the parameters 233 can indicate that the data traffic associated with the peripheral 206 is to be transmitted along the second communication channel 232 (isochronous). To that end, the ML computing module 216 can determine, based on such, that the priority is correct for the data traffic associated with the peripheral 206.

In some implementations, the service computing module 210 can receive the priority inversion indicator 252 from the ML computing module 216. The service computing module 210 can update the index 250 stored in the cache 218 to indicate that the data traffic associated with the peripheral 206 is priority-inversed. Specifically, the service computing module 210 can update the index 250 stored in the cache 218 to indicate that the data traffic associated with the peripheral indicator of the peripheral 206 is priority-inversed.

The service computing module 210 can identify a communication request by the application 220 for communication with the peripheral 206. In some examples, the communication request can include a peripheral identifier for the peripheral 206. In response to the communication request, the service computing module 210 can access the index 250 that is stored by the cache 218, and determine, based on the index 250, that the data traffic associated with the peripheral 206 is priority-inversed. That is, the service computing module 210 can access the index 250 that is stored by the cache 218, and determine, based on the index 250, that the data traffic associated with the peripheral identifier of the peripheral 206 is priority-inversed.

The filter driver computing module 214, in response to the data traffic associated with the peripheral 206 being priority-inversed, places the data traffic in a queue associated with the second communications channel 232. Specifically, the filter driver computing module 214, in response to the communication request by the application for communication with the peripheral 206, places such request in a first stack (or queue) 260. The stack 260 is the "high" priority queue for requests for data traffic transmission along the second communication channel 232. For example, the stack 260 can be a USB device stack. To that end, based on the stack 260, the filter driver computing module 214 provides the requests to the controller computing module 212 for transmission of traffic data along the second communication channel 232 (isochronous channel). The controller computing module 212 facilitates the traffic data for the peripheral 206 along the second communications channel 232 through the dock 204.

Moreover, the second stack (or queue) 262 can include requests for communication with the peripheral 206 over the first communication channel 230 (non-isochronous/bulk channel). The stack 262 is the "lower" priority queue for requests for data traffic transmission along the first communication channel 230. To that end, based on the stack 262, the filter driver computing module 214 provides the requests to the controller computing module 212 for transmission of traffic data along the first communication channel 230 (non-isochronous/bulk channel). The controller computing module 212 facilitates the traffic data for the peripheral 206 along the first communications channel 230 through the dock 204.

In some examples, the information handling system 202 interacts with the peripheral 206 through the dock 204 using the first communications channel 230 and/or the second communications channel 232. For example, when the application 220 includes a video conferencing application, the application 220 can provide traffic data to a monitor (peripheral 206) to display an image/video over the second communications channel 232 (isochronous channel)—e.g., when the priority is inversed (priority-inversed) for the data traffic associated with the monitor, as described above.

FIG. 3 illustrates a flowchart depicting selected elements of an embodiment of a method 300 for priority reversing data traffic for latency sensitive peripherals. The method 300 may be performed by the information handling system 100, the computing environment 200, and/or the information handling system 202, and with reference to FIGS. 1-2. It is noted that certain operations described in method 300 may be optional or may be rearranged in different embodiments.

The service computing module 210 receives i) the notification 231 of the connection of the peripheral 206 to the dock 204, and ii) the parameters 233 of the peripheral 206 (302). The service computing module 210, based on the parameters 233 associated with the peripheral 206, identifies that the interface type associated with the peripheral 206 is a bulk interface (304). The service computing module 210, based on the parameters associated with the peripheral 206, determines a data traffic priority associated with the peripheral 206 (306). The service computing module 210, based on the bulk interface type associated with the peripheral 206 and the data traffic priority associated with the peripheral 206, determines that the data traffic associated with the peripheral is priority-inversed (308). The service computing module 210 can update the index 250 stored in the cache 218 to indicate that the data traffic associated with the peripheral 206 is priority-inversed (310). The service computing module 210 can identify a communication request by the application 220 for communication with the peripheral 206 (312). In response to the communication request, the service computing module 210 can access the index 250 that is stored by the cache 218 (314). The service computing module 210 can determine, based on the index 250, that the data traffic associated with the peripheral 206 is priority-inversed (316). The filter driver computing module 214, in response to the data traffic associated with the peripheral 206 being priority-inversed, provides access to the peripheral 206 through the second communications channel 232 (318).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing data traffic for latency sensitive peripherals, comprising:
receiving i) a device arrival notification of a connection of a peripheral to a computing dock, and ii) parameters of the peripheral, wherein an information handling system is connected to the computing dock for access to the peripheral;
identifying, from the parameters of the peripheral, that an interface type associated with the peripheral is a bulk interface, the bulk interface associated with a first communication channel between the information handling system, the computing dock, and the peripheral, the first communication channel associated with a first latency;
determining, from the parameters of the peripheral, a data traffic priority associated with the peripheral;
determining, based on the bulk interface type and the data traffic priority, that the data traffic associated with the peripheral is priority-inversed;
updating an index stored in a cache to indicate that the data traffic associated with the peripheral is priority-inversed;
identifying a communication request by an application executing on the information handling system for communication with the peripheral;
in response to the communication request:
accessing the index;
determining, based on the index, that the data traffic associated with the peripheral is priority-inversed; and
in response to determining that the data traffic associated with the peripheral is priority-inversed, placing the data traffic in a queue associated with a second communication channel defined between the information handling system, the computing dock, and the peripheral, the second communication channel having a second latency, wherein the first latency is greater than the second latency.

2. The computer-implemented method of claim 1, further comprising:
receiving a particular identifier associated with the peripheral;
comparing the particular identifier with a listing of identifiers stored by the index;
determining, based on the comparing, that the listing is absent the particular identifier; and
in response to the listing being absent the particular identifier, identifying the interface type associated with the peripheral and determining the data traffic priority associated with the peripheral.

3. The computer-implemented method of claim 1, wherein the parameters include a device class of the peripheral.

4. The computer-implemented method of claim 1, wherein the peripheral is a network-enabled video camera.

5. The computer-implemented method of claim 1, wherein the peripheral is an universal serial bus (USB) device.

6. The computer-implemented method of claim 1, wherein the computing dock is a wireless computing dock.

7. The computer-implemented method of claim 1, wherein the first communication channel is non-isochronous communication channel.

8. The computer-implemented method of claim 1, wherein the second communication channel is an isochronous communication channel.

9. An information handling system comprising a processor having access to memory media storing instructions executable by the processor to perform operations, comprising:
receiving i) a device arrival notification of a connection of a peripheral to a computing dock, and ii) parameters of the peripheral, wherein an information handling system is connected to the computing dock for access to the peripheral;
identifying, from the parameters of the peripheral, that an interface type associated with the peripheral is a bulk interface, the bulk interface associated with a first communication channel between the information handling system, the computing dock, and the peripheral, the first communication channel associated with a first latency;
determining, from the parameters of the peripheral, a data traffic priority associated with the peripheral;
determining, based on the bulk interface type and the data traffic priority, that the data traffic associated with the peripheral is priority-inversed;
updating an index stored in a cache to indicate that the data traffic associated with the peripheral is priority-inversed;
identifying a communication request by an application executing on the information handling system for communication with the peripheral;
in response to the communication request:
accessing the index;
determining, based on the index, that the data traffic associated with the peripheral is priority-inversed; and
in response to determining that the data traffic associated with the peripheral is priority-inversed, placing the data traffic in a queue associated with a second communication channel defined between the information handling system, the computing dock, and the peripheral, the second communication channel having a second latency, wherein the first latency is greater than the second latency.

10. The information handling system of claim 9, the operations further comprising:
receiving a particular identifier associated with the peripheral;
comparing the particular identifier with a listing of identifiers stored by the index;
determining, based on the comparing, that the listing is absent the particular identifier;
in response to the listing being absent the particular identifier, identifying the interface type associated with the peripheral and determining the data traffic priority associated with the peripheral.

11. The information handling system of claim 9, wherein the parameters include a device class of the peripheral.

12. The information handling system of claim 9, wherein the peripheral is a network-enabled video camera.

13. The information handling system of claim 9, wherein the peripheral is an universal serial bus (USB) device.

14. The information handling system of claim 9, wherein the computing dock is a wireless computing dock.

15. The information handling system of claim 9, wherein the first communication channel is non-isochronous communication channel.

16. The information handling system of claim 9, wherein the second communication channel is an isochronous communication channel.

17. A non-transitory computer-readable medium storing software comprising instructions executable by one or more computers which, upon such execution, cause the one or more computers to perform operations comprising:
receiving i) a device arrival notification of a connection of a peripheral to a computing dock, and ii) parameters of the peripheral, wherein an information handling system is connected to the computing dock for access to the peripheral;
identifying, from the parameters of the peripheral, that an interface type associated with the peripheral is a bulk interface, the bulk interface associated with a first communication channel between the information handling system, the computing dock, and the peripheral, the first communication channel associated with a first latency;
determining, from the parameters of the peripheral, a data traffic priority associated with the peripheral;
determining, based on the bulk interface type and the data traffic priority, that the data traffic associated with the peripheral is priority-inversed;
updating an index stored in a cache to indicate that the data traffic associated with the peripheral is priority-inversed;
identifying a communication request by an application executing on the information handling system for communication with the peripheral;
in response to the communication request:
accessing the index;
determining, based on the index, that the data traffic associated with the peripheral is priority-inversed; and
in response to determining that the data traffic associated with the peripheral is priority-inversed, placing the data traffic in a queue associated with a second communication channel defined between the information handling system, the computing dock, and the peripheral, the second communication channel having a second latency, wherein the first latency is greater than the second latency.

* * * * *